(12) United States Patent
Lee et al.

(10) Patent No.: US 6,549,245 B1
(45) Date of Patent: Apr. 15, 2003

(54) METHOD FOR PRODUCING A VISUAL RHYTHM USING A PIXEL SAMPLING TECHNIQUE

(75) Inventors: Jin-Ho Lee, Seoul (KR); Hyeok-Man Kim, Seoul (KR); Moon-Haeng Huh, Seoul (KR); Dong-Hwi Choi, Seoul (KR); Samuel Moon-Ho Song, Seoul (KR)

(73) Assignee: Korea Telecom, Sugnam-shi (KR)

( * ) Notice: Subject to any disclaimer, the term of this patent is extended or adjusted under 35 U.S.C. 154(b) by 0 days.

(21) Appl. No.: 09/453,689

(22) Filed: Dec. 3, 1999

(30) Foreign Application Priority Data

Dec. 18, 1999 (KR) ............................................. 98-56144

(51) Int. Cl.[7] ................................................. H04N 7/18
(52) U.S. Cl. ................... 348/700; 375/240.21; 348/701
(58) Field of Search ....................... 375/240.25–240.29, 375/240.21; 348/722, 96–109, 700–702

(56) References Cited

U.S. PATENT DOCUMENTS

| | | | | |
|---|---|---|---|---|
| 5,821,945 A | * | 10/1998 | Yeo et al. ................... | 345/440 |
| 5,835,163 A | * | 11/1998 | Liou et al. .................. | 348/699 |
| 5,870,754 A | * | 2/1999  | Dimitrova et al. ............. | 707/1 |
| 5,995,095 A | * | 11/1999 | Ratakonda .................. | 382/225 |
| 6,195,458 B1 | * | 2/2001 | Warnick et al. ............. | 345/723 |
| 6,278,446 B1 | * | 8/2001 | Liou et al. .................. | 382/168 |

* cited by examiner

*Primary Examiner*—Andy Rao
(74) *Attorney, Agent, or Firm*—Staas & Halsey LLP

(57) ABSTRACT

A method for producing a visual rhythm in a video system, includes the steps of: a) sampling a portion of pixels contained at each of frames; and b) producing the visual rhythm summarizing changes of video contents by using the result of the sampling.

14 Claims, 8 Drawing Sheets

DIAGONAL

CROSS

AREA

METHOD FOR PRODUCING A VISUAL RHYTHM USING A PIXEL SAMPLING TECHNIQUE

BACKGROUND OF THE INVENTION

1. Technical Field

The present invention relates to a method for producing a visual rhythm; and, more particularly, to a method for producing a visual rhythm which is a single image summarizing changes of video contents by using a pixel sampling technique, and employing the visual rhythm at various digital video application systems and each of digital video related software products.

2. Description of the Related Arts

Presently, according as a digital application field, for example, a broadcasting digital video signal editing, a digital library, a video database, a multimedia video contents production, and a video streaming at an internet, increases, a video indexing research has become active.

As is well known, since a video signal comprises a sequence of image 'frames', all of the video contents are recognized through a control function of a VCR (Video Cartridge Recorder), i.e., a play function, a fast play function, a rewind function and a temporary stop function etc.

The video indexing is a mechanism capable of approaching to a certain portion of the video signal. The video indexing technique has two sorts: annotation-based indexing and content-based indexing. indexing. The annotation-based indexing technique searches a specified section of the video contents through the annotations that are keywords or texts made by an annotator.

On the other hand, the content-based indexing technique searches a specified section of the video contents through the analysis of the video signal characteristics.

Preferably, an effective video indexing technique may be to employ two techniques together, i.e., searching of a specific part of video contents is performed based on both annotations and contents-based indexes.

The most important thing in the content-based indexing technique is a 'shot change detection'.

The video signal is made and edited by a 'shot' unit. The shot is a unit of action photographed without interruption and constituting a single camera view. In general, the duration of one shot is between one or ten seconds according to the contents of the video.

Since the video signal is made by the shot unit, it is necessary to index the video signal based on the shot unit.

In case that the shot change detection is performed manually, the detection cost and the detection time are increased. Therefore, a software has to be employed to automatically detect the shot change detection.

However, it is impossible to perfectly detect all of shots of the video signal with the software. During the automatic detection, there occur false positive shots and missing shots. This is originated from the editing effect.

The editing connects each of the shots by using cut, dissolve and wipe effects. The cut simply connects two adjacent shots. This is called as an abrupt change. On the other hand, the dissolve and the wipe gradually connect two shots through a number of frames. They are called as gradual changes.

A cut is simply a concatenation of two shots. In other words, no special effects are introduced. A dissolve is a simultaneous application of a fade-out (of an outgoing shot) and a fade-in (of an incoming shot). A wipe is another edit effect where an incoming shot appears at one or more parts of an outgoing shot, and then grows gradually until it covers the entire frame.

Recently, according as a digital editing equipment is advanced, three-dimensional editing techniques such as rolling, flying, and Doppler effects are also well known.

A shot boundary detection detects a shot boundary at the edited video signal.

Generally, the shot boundary at the abrupt change such as the cut is easily detected by using a pixel based comparison of signal characteristics, a frame-to-frame comparison of average signal characteristics, a histogram, and a motion. In this case, however, some cases such as shots having camera movements, i.e. panning and zooming, the shot boundary at a very bright or dark background, or a background having very fast moving objects may not be detected.

On the other hand, the shot boundary of the gradual changes such as the dissolves and the wipes is hardly detected.

The shot boundary detection error at a presently developed shot boundary detection algorithm ranges from 10 to 20% in case that the gradual change hardly occurs. Therefore, the confirmation or the verification of the boundary detection is required.

In the prior art, the confirmation or the verification of the shot boundary detection is performed only with the manual VCR functions, so that the exact verification is not possible.

SUMMARY OF THE INVENTION

It is, therefore, an object of the invention to provide a method for producing the visual rhythm by using the pixel sampling technique so as to detect and verify the shot boundary.

In accordance with an aspect of the present invention, there is provided a method for producing a visual rhythm in a video system, comprising the steps of: a) sampling a portion of pixels contained at each of frames; and b) producing the visual rhythm summarizing changes of video contents by using the result of the sampling.

In accordance with another aspect of the present invention, there is provided a computer-readable medium for producing a visual rhythm, comprising the steps of: a) sampling a portion of pixels contained at each of frames; and b) producing the visual rhythm summarizing changes of video contents by using the result of the sampling.

BRIEF DESCRIPTION OF THE DRAWINGS

For a more complete understanding of the present invention and the advantage thereof, reference is now made to the following description taken in conjunction with the accompanying drawings in which.

DETAILED DESCRIPTION OF THE INVENTION

Figure 1:
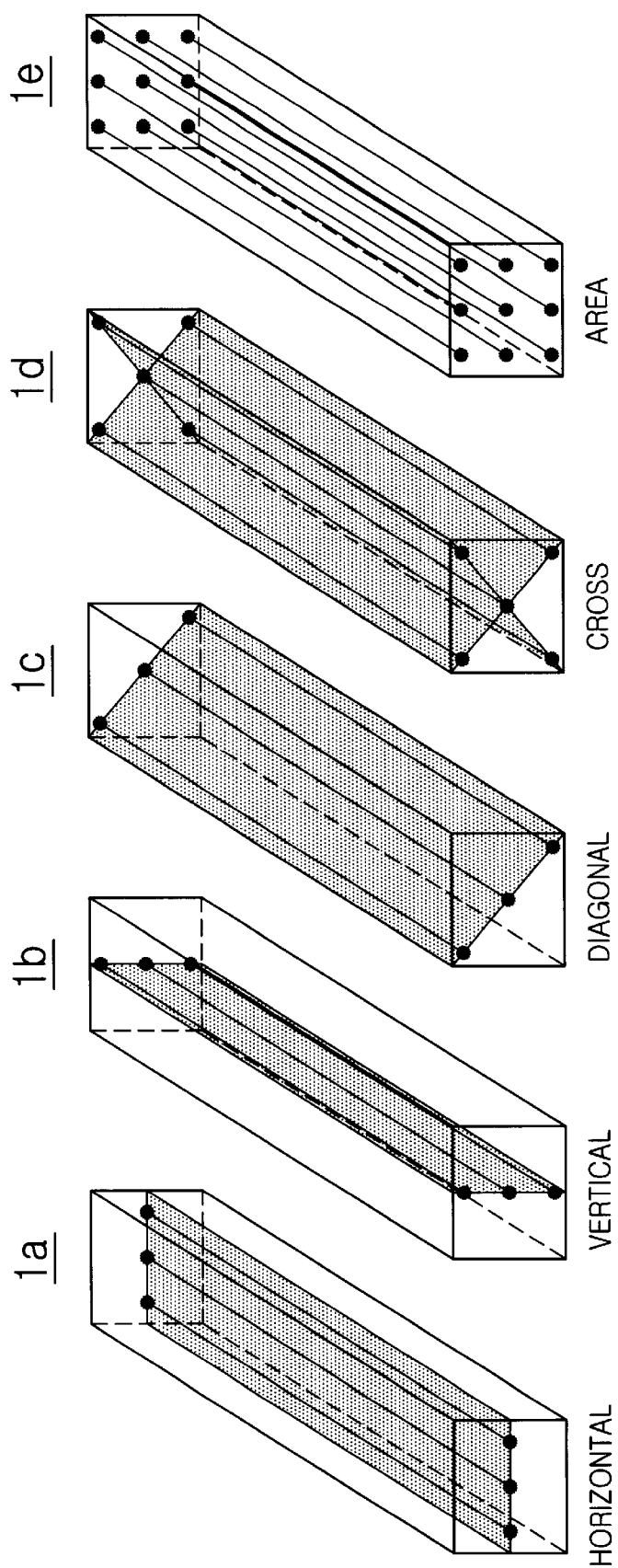
FIG. 1 is a diagram of pixel sampling method for generating a visual rhythm in accordance with the present invention.

FIG. 1 is a diagram of pixel sampling method for generating a visual rhythm used in the present invention.

As shown in FIG. 1, the pixel sampling method has five approaches: a horizontal sampling 1a, a vertical sampling 1b, a diagonal sampling 1c, a crossing sampling 1d and a regional sampling 1e.

The visual rhythm is an single image summarizing a video contents. Especially, the visual rhythm using the diagonal sampling 1c enables the edited portion, which is edited by the cut, the wipe and the dissolve etc., to be expressed as a visible pattern, for example, a vertical line, an oblique line, a curved line and a gradual change of color. In addition, the visual rhythm enables the video portion effected by a camera movement, a light and an object movement to be expressed as some visible forms.

The visual rhythm is produced as follows.

If each value of the pixels of a video signal (V) is $f_v(x,y,t)$ the video signal V is expressed as $$V = \{f_v(x,y,t)\} \quad \text{Eq. (1)}$$

$x,y,t \in \{0,1,2,\ldots\}$

From Eq. (1), the pixel value $f_{Thumbnail}(x,y,t)$ of the reduced video signal $V_{Thumbnail}$, which is made by reducing each frame of the video signal by r times in both horizontal and vertical directions, is derived as $$V_{Thumbnail} = \{f_{Thumbnail}(x,y,t)\} \quad \text{Eq. (2)}$$

$x,y,t \in \{0,1,2,\ldots\}$

From equations Eq. (1) and Eq. (2), the relation between the video signal V and the reduced video signal $V_{Thumbnail}$, can be defined as $$f_{Thumbnail}(x,y,t) = f_v(rx+k_x, ry+k_y, t) \quad \text{Eq. (3)}$$

$x,y,t \in \{0,1,2,\ldots\}$, $k_x, k_y \in \{0,1,2,\ldots,r-1\}$
wherein, $k_x$ and $k_y$ mean sampling offsets.

From Eq. (3), the visual rhythm VR of the video signal V is made by using the reduced video signal $V_{Thumbnail}(x,y,t)$. Thus $$VR = \{f_{VR}(z,t)\} = \{f_{Thumbnail}(x(z),y(z),t)\} \quad \text{Eq. (4)}$$

Referring to Eq. (4), the visual rhythm is a two dimensional image which is produced by sampling a portion of the pixel value $f_{Thumbnail}(x,y,t)$ of the reduced three dimensional video signal.

As shown in FIG. 1, according to the each of samplings, the visual rhythm may be various. The selection of the sampling method is determined by the expressive power for the content changes of the video signal.

Figure 2:
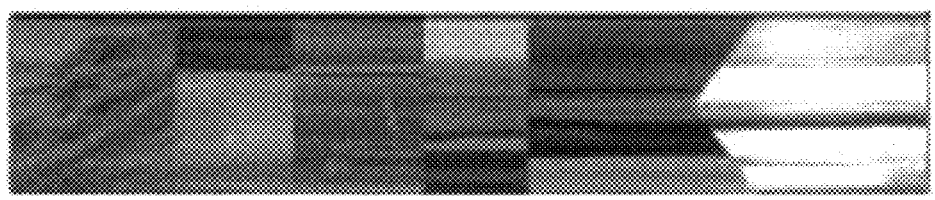
FIG. 2 shows a diagram of the visual rhythm for an individual pixel sampling.
Figure 2:
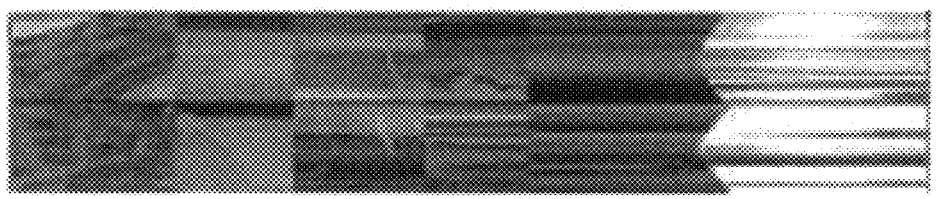
Figure 2:
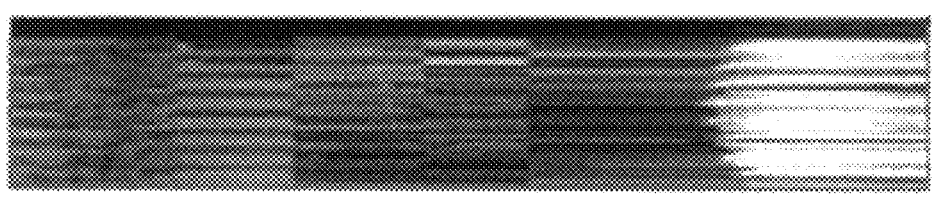

FIG. 2 shows the visual rhythm for each of the pixel samplings, i.e., the diagonal sampling 1c, the crossing sampling 1d and the regional sampling 1e of FIG. 1.

Referring to FIG. 2, the regional sampling 2c can represent the contents of an entire frame at a side view of a signal processing. However, a number of horizontal lines are generated to hinder the user examining the shot boundaries. Also, the crossing sampling 2b generates a horizontal line to hinder the user examining the shot boundaries.

On the other hand, although the diagonal sampling 2a can not represent the contents of the entire frame, there are many good characteristics to verify the shot boundary detection.

The preferred embodiment of the present invention is described by using the diagonal sampling 2a.

The method of efficiently producing the visual rhythm is described as follows.

If a video is just digitized without compression, the pixel sampling is also simple. However, the video is stored in compressed form, it is necessary to decompress the stored video so as to produce the visual rhythm.

If, among various compression techniques, the video is compressed by DCT(Discrete Cosine Transform)-based techniques such as M-JPEG(Motion Joint Photographs Expert Group) or an inter-frame compression of MPEG (Moving Picture Experts Group), the pixel sampling of the compressed video is efficiently performed.

At the DCT-based techniques, an input frame is divide to 8×8 blocks. After performing the DCT, each of the blocks is represented with one DC(Direct Current) coefficient and 63 number of AC(Alternative Current) coefficients. Herein, the DC coefficient is the average value of 64 pixels. Thus, if a frame is constructed only with the DC coefficient, an image reduced by 1/64 can be made.

In case that the reduced DC image is used as a thumbnail, the reduced video signal $f_{Thumbnail}(x,y,t)$ and the pixel value of the video signal(V) have a characteristic like Eq. (5)

$$f_{Thumbnail}(x, y, t) = \frac{1}{8} \sum_{k_x=0}^{7} \sum_{k_y=0}^{7} f_v(8x+k_x, 8y+k_y, t) \quad \text{Eq. (5)}$$

$x,y,t \in \{0,1,2,3,\ldots\}$

If the DC image is used as a thumbnail, an inverse DCT process is not necessary to shorten producing time of the visual rhythm.

Figure 3:
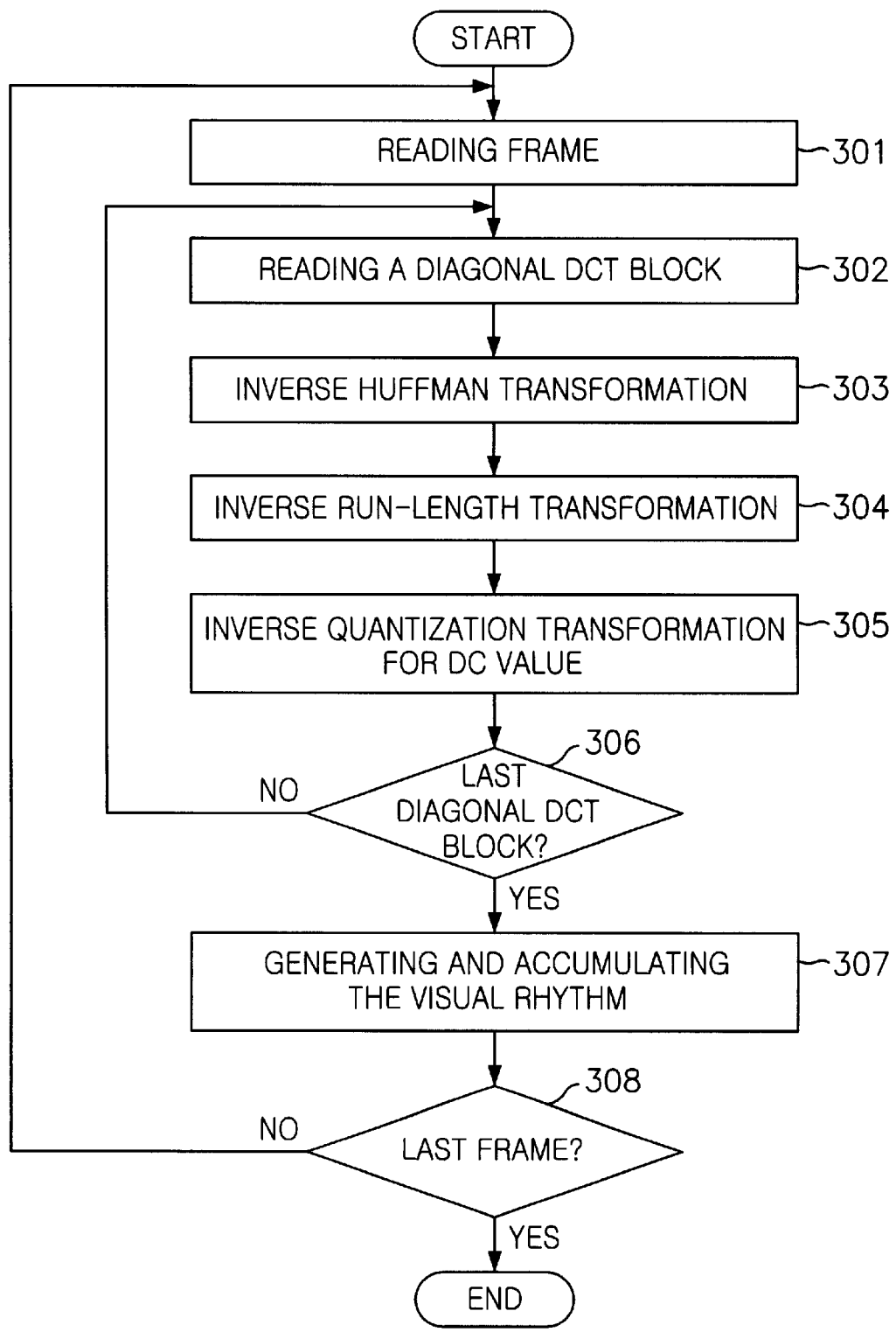
FIG. 3 describes a flowchart of a method of generating the visual rhythm in accordance with the present invention.

FIG. 3 shows a flowchart of the method of producing the visual rhythm, wherein the video is of M-JPEG (or the I frames of MPEG)

At the M-JPEG technique, each of frames is compressed like the JPEG technique. At the JPEG technique, the image is divided to 8×8 pixel blocks. And then, the DCT transformation, a quantization, a run-length and a Huffman transformation are performed.

After performing above described process, 64 number of pixels in the 8×8 block are changed to one DC coefficient and 63 AC coefficients.

In order to generating the visual rhythm with the M-JPEG compressed video, each of the frames may be decompressed. That is, a series of decompression processes are performed. The decompression processes are an inverse Huffman transformation, an inverse run-length, an inverse quantization, and an inverse DCT transformation. However, if the inverse DCT transformation process can be omitted, the visual rhythm production time will be greatly reduced.

As shown in FIG. 3, in order to produce the visual rhythm, first a frame is read (S301). And then, the diagonal DCT blocks at the frame are read (S302). Thereafter, the inverse Huffman transformation, the inverse run-length transformation and the inverse quantization for the DC coefficient are performed for each of the DCT blocks to generate each of DC coefficients (S302–S306)

And then, the DC coefficients for each of the frames are accumulated to generate the visual rhythm of the entire video (S307).

Hereinafter, the characteristics of visual rhythm and the shot verification are described.

The visual rhythm is a single image representing the contents of an entire video.

The pixels extracted from a diagonal line of a frame contained at a certain shot have a similar visual characteristic. Therefore, visual changes (or shot boundaries) are presented as some visually identifiable patterns on the visual rhythm. These changes are easily detected with eyes.

The method for producing the visual rhythm in accordance with the present invention can be stored in a computer-readable medium, e.g. an optical disk, a hard disk and so on.

FIGS. 4a to 4d are diagrams representing the editing effect on the visual rhythm in accordance with the present invention.

Figure 4A:
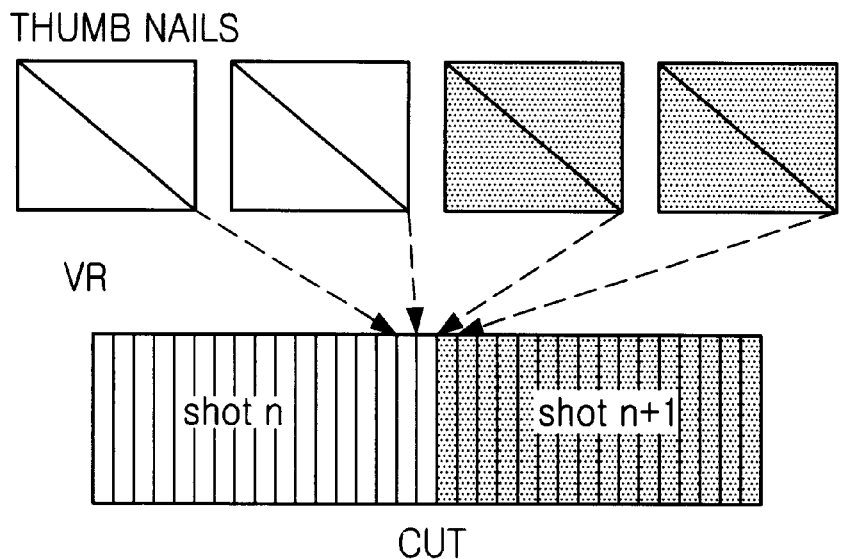
FIGS. 4a to 4d are diagrams representing an editing effect of the visual rhythm in accordance with the present invention.

Referring to FIG. 4a, the shot boundary connected with the cut is presented by a vertical line at the visual rhythm.

Figure 4B:
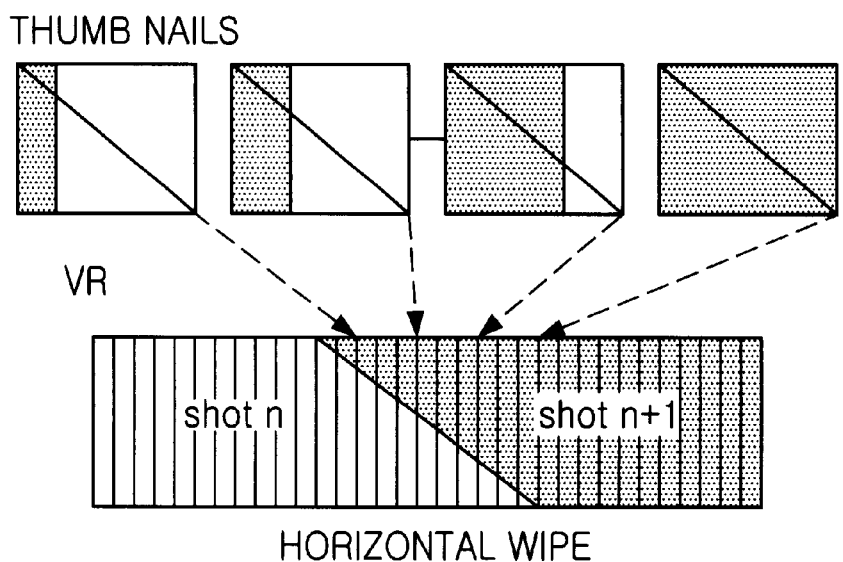

Referring to FIG. 4b, the shot boundary connected with a horizontal and left-to-right wipe, is presented by an oblique line. In addition, the shot boundary connected with a vertical and top-to-bottom wipe is also presented by the oblique line.

Figure 4C:
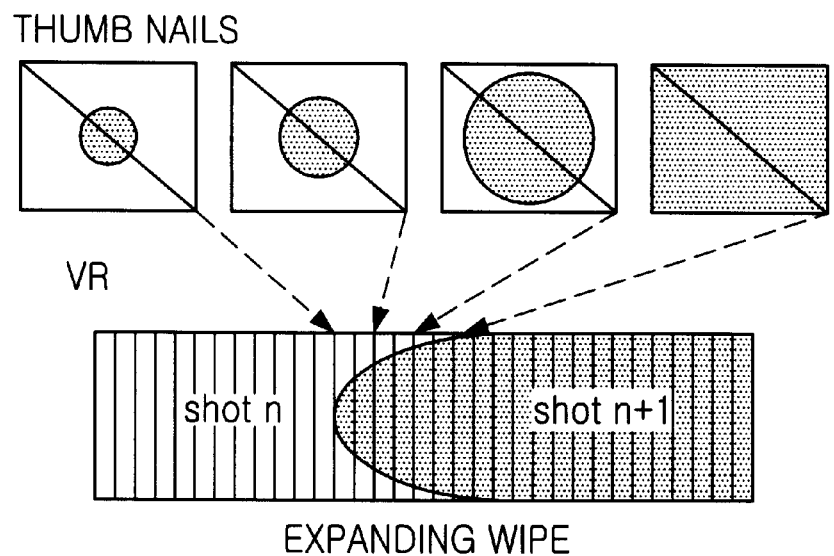

Referring to FIG. 4c, the shot boundary connected with an expanding and center-to-outskirts wipe, is presented by a curved line. In the other hand, the shot boundary connected with an absorbing and outskirts-to-center wipe, is presented by a curved line changed with 180 degrees.

Figure 4D:
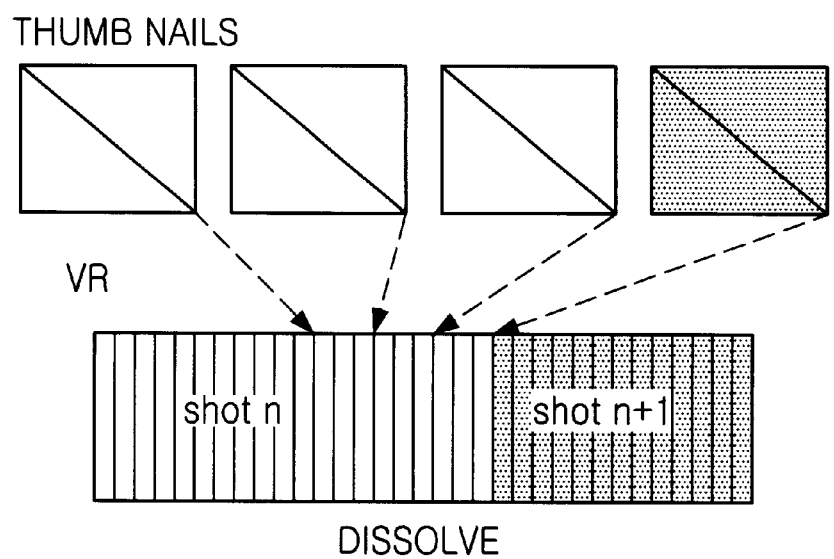

Referring to FIG. 4d, the shot boundary connected with the dissolve is not represented by a line form. Instead, the gradual color change is presented.

Figure 5:
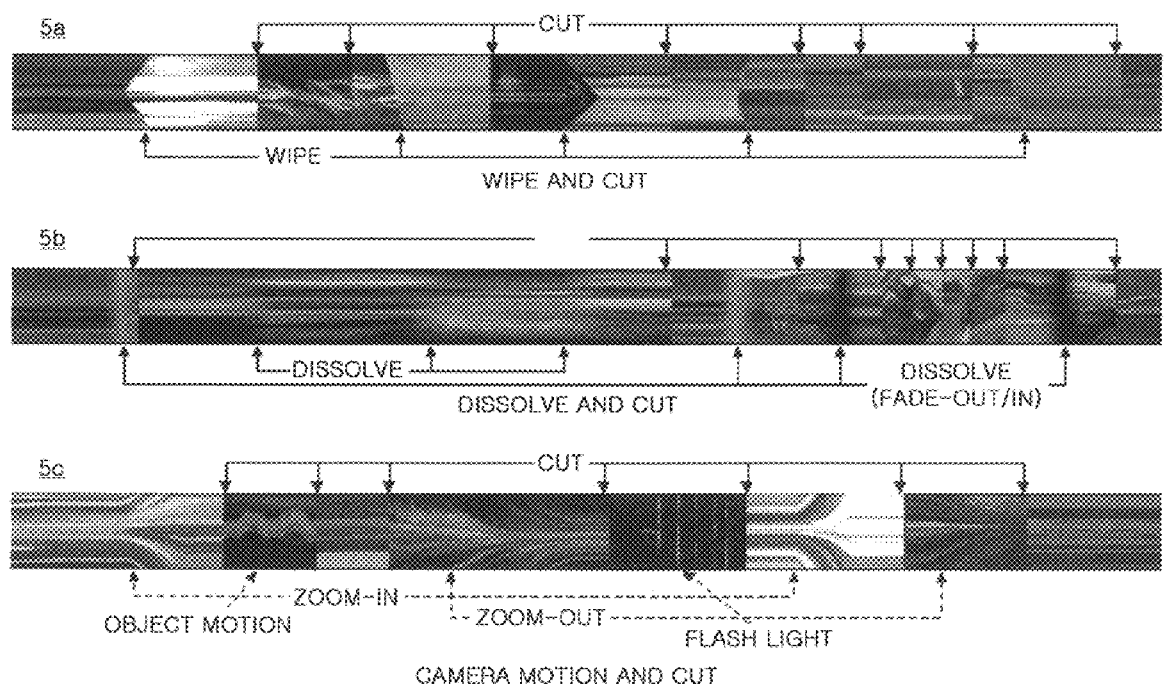
FIG. 5 is an exemplary drawing of the visual rhythm in accordance with preferred embodiment of the present invention.

As shown in FIG. 5, the visual rhythm from the actual video signal is depicted.

Referring to FIG. 5, without playing the video, the various editing effects are detected with the visual rhythm. That is, the visual rhythm 5a of the wipes and the cuts and another visual rhythm 5b of the dissolves and the cuts enable the editor to verify the shot boundary.

In addition, a camera movement such as zoom-ins or zoom outs, flashlights, and object movements are also shown on the visual rhythm 5c.

Hereinafter, in order to show the usefulness of the visual rhythm, a shot verifier is explained.

The shot verifier is a software tool and enables the shot detection errors to be shown with eyes and to be corrected in hand.

The shot verifier may be utilized with a shot detector, which is a tool implemented with the shot boundary detection algorithm. In case that the shot verifier is used alone, shot boundaries could be detected in hand.

The shot verifier has a number of functions: a function of summarizing entire video contents, a function of showing the editing effects with eyes, a function showing a certain section of the video with frame-accurate controls, a VCR function, a shot boundary hand-operated setting and removal. These functions reduce the time for shot verification in contrast to the verification with the VCR functions.

Figure 6:
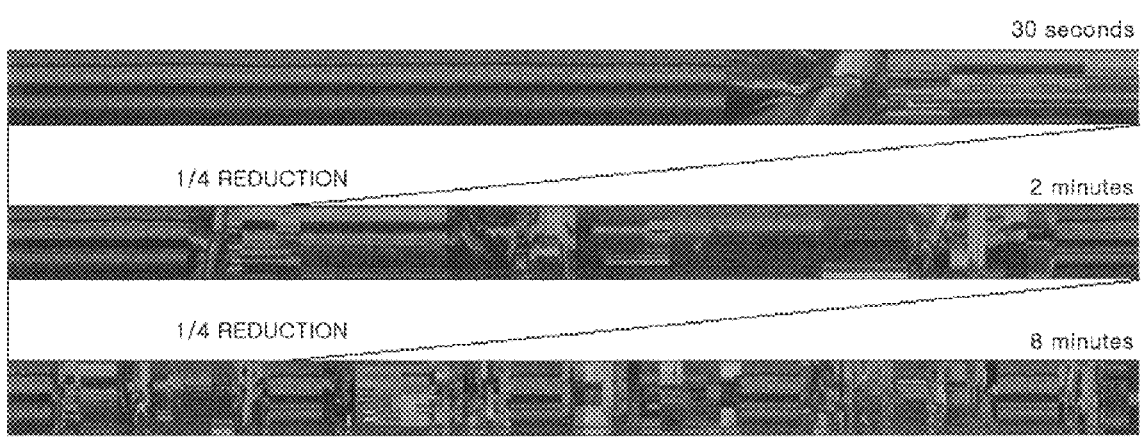
FIG. 6 is an exemplary drawing representing the magnification and the reduction of the visual rhythm.

In the preferred embodiment of the present invention, the shot verifier is implemented by using the visual rhythm of 720×480 M-JPEG video. FIG. 6 shows the change of the visual rhythm during eight minutes.

Figure 7:
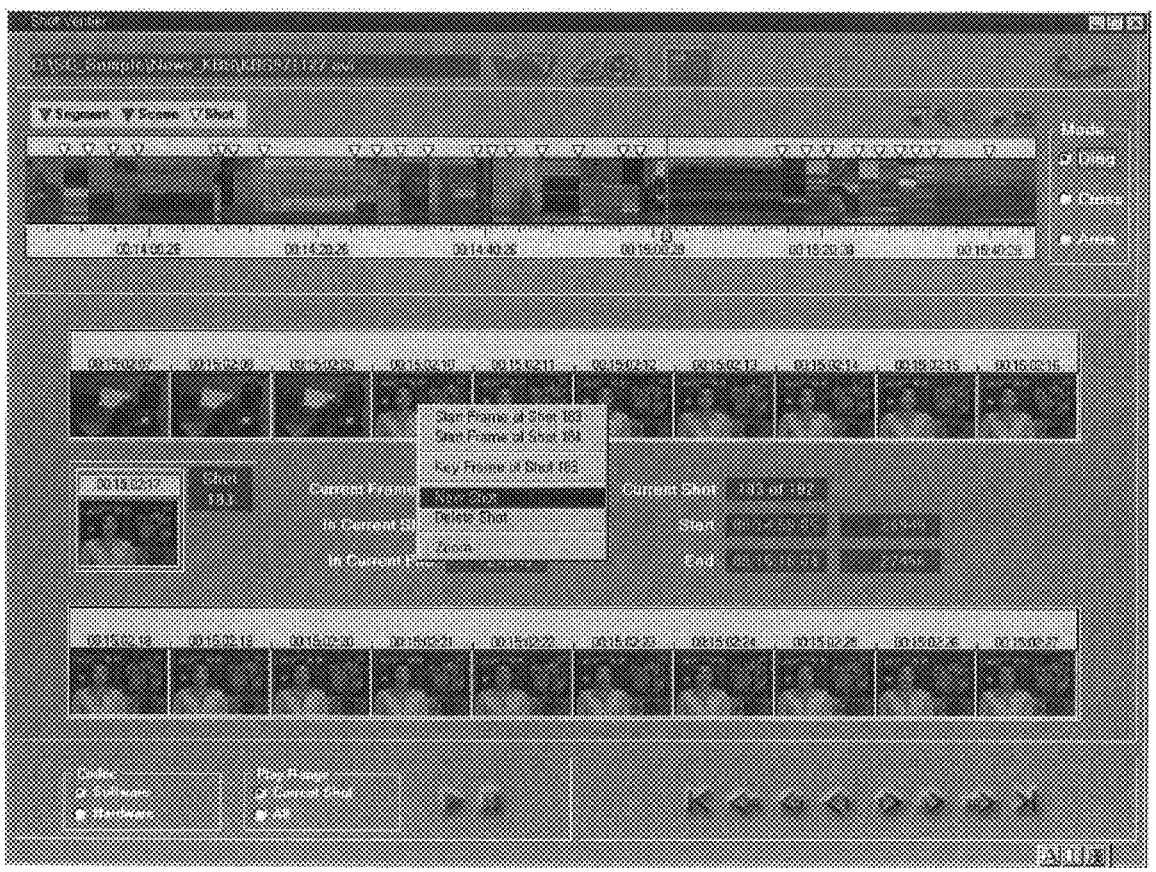
FIG. 7 shows a diagram representing a user interface of a shot verification unit.

FIG. 7 is a diagram representing a graphical user interface of the shot verifier in accordance with the preferred embodiment of the present invention. With this shot verifier, by viewing the visual rhythm and using frame-accurate controls, the operator determines the frames that appear to be candidates for false positives and/or undetected shot boundaries. The shot verifier provides a sequence of 90×60 thumbnails to aid the operator for such operations. These thumbnails are sixty-four times smaller than the original 720×480 frames. The shot verifier can also provide the original frames at the user request. In addition, it provides VCR functions for shot-by-shot playing and frame-accurate random positioning. With these frame-accurate controls and VCR functions, the operator can manually delete false positives and add newly found shots. The operator navigates the three major parts of the interface: the visual rhythm along with certain markers, the list of thumbnails surrounding the current frame, and the frame accurate play controls. We describe these individual parts in detail.

At the top of the interface, the visual rhythm is displayed with automatically detected shot boundaries marked at their corresponding locations with small inverse triangles or shot boundary markers. On the upper right corner of the visual rhythm, small buttons for zooming (enlarging and reducing) and scrolling the visual rhythm is provided. On top of a visual rhythm, a cursor is provided to indicate the current position (time code or frame number). By dragging and dropping the cursor at any position of the visual rhythm, the user can change the location of the current frame.

At the middle of the interface, the thumbnail list of twenty-one frames surrounding the current frame is displayed. At the center of the list, showing "Shot 183", is the current frame, as indicated by the cursor on the visual rhythm. Other thumbnails, ten above and ten below, are the frames immediately preceding and following the current frame, respectively.

At the bottom of the interface, various options/buttons for frame accurate controls are provided. For instance the operator is able to move the current frame by 1, 5, 30 frames forward or backward. Recall that the current frame can also be updated by moving the cursor on the visual rhythm. In any case, such current frame update results in redisplay of the thumbnail list. When the play button is selected, a new window appears to play from the current frame. The "Play Range" option indicates whether to play the entire video or the current shot. Currently, no fast forward nor rewind buttons are provided as we have provided the random positioning function.

Following the automatic shot detector, the shot verification process may proceed as follows. If a certain frame appears suspicious, upon viewing the visual rhythm, the cursor is moved near that frame. For instance, FIG. 7 shows the visual rhythm where there appears to be a shot boundary without the boundary marker (inverse triangle). Therefore, the cursor has been moved near that frame by the drag and drop operation. Then, twenty-one thumbnails are redisplayed according to this new current frame. Quick glance over the thumbnail display indicates that the fourth thumbnail is actually the first frame of a new shot, missed by the automatic detector. False positive shots are detected similarly. In any case, when detected, deletion and/or addition of shot boundaries is processed with a left mouse button click, at which a small menu appears as shown in FIG. 7. The menu is self-explanatory; it basically provides the mechanics for deleting and adding shot boundaries. Such updates to shot boundaries result in redisplay of the markers (inverse triangles) on top of the visual rhythm at the top of the interface. For instance, the user may select "New Shot" to insert a missing shot or "Delete Shot" to discard a false positive. The user may also select the "Key Frame" for the current shot (183). Other interface is also available for clustering various shots in segments and scenes.

In this manner, the visual rhythm enables the user to correct the missing shot and the false detected shot without playing the video.

Various modification and alterations of this invention will become apparent to those skilled in the art without departing from the scope and spirit of this invention. It should therefore be understood that this invention is not unduly limited to the illustrative embodiments set forth above, but it to be controlled by the limitations set forth in the claims and equivalents thereof.

What is claimed is:

1. A method for producing a visual rhythm in a video system, comprising:

sampling a portion of pixels contained at each frame, wherein the pixels are located at predefined positions of the frame;

arranging the sampled pixels on a vertical line with a single pixel width;

accumulating the vertical pixel line along a time axis; and repeating said sampling, arranging, and accumulating on a frame by frame basis until an end of input video stream, thereby generating a visual rhythm.

2. The method of claim 1, wherein said sampling includes the step of performing decompression processing to obtain only DC coefficients by carrying out an inverse Huffman transformation, an inverse run-length transformation, and an inverse quantization of DC coefficients for each of pixel blocks.

3. The method of claim 2, wherein said arranging includes the step of producing the visual rhythm for an entire video by using the DC coefficients.

4. The method of claim 3, wherein the visual rhythm enables the video editing effects including cuts, wipes, dissolves and three dimensional effects to be presented by line patterns, including a vertical line, an oblique line, and a curved line, and gradual color change.

5. The method of claim 3, wherein the visual rhythm visually represents video editing effects, camera motions, flashlights and object movements, and displays the video content changes at one screen.

6. The method of claim 3, wherein the visual rhythm is employed at a shot verifier, which verifies a shot boundary without playing the video.

7. The method of claim 3, the visual rhythm is employed at a video indexing system, a digital video editing system, a digital library, a video database, a multimedia video contents production system.

8. A computer-readable medium storing instructions for executing a method for producing a visual rhythm, the method comprising:

sampling a portion of pixels contained at each frame, wherein the pixels are located at predefined positions of the frame;

arranging the sampled pixels on a vertical line with a single pixel width;

accumulating the vertical pixel line along a time axis; and repeating said sampling, arranging, and accumulating on a frame by frame basis until an end of input video stream, thereby generating a visual rhythm.

9. The computer-readable medium of claim 8, wherein said sampling includes the step of performing decompression processing to obtain only DC coefficients by carrying out an inverse Huffman transformation, an inverse run-length transformation, and an inverse quantization of DC coefficients for each of pixel blocks.

10. The computer-readable medium of claim 9, wherein said arranging includes the step of producing the visual rhythm for an entire video by using the DC coefficients.

11. The computer-readable medium of claim 10, wherein the visual rhythm enables the video editing effects including cuts, wipes, dissolves and three dimensional effects to be presented by line patterns, including a vertical line, an oblique line, and a curved line, and gradual color change.

12. The computer-readable medium of claim 10, wherein the visual rhythm visually represents video editing effects, camera motions, flashlights and object movements, and displays the video content changes at one screen.

13. The computer-readable medium of claim 10, wherein the visual rhythm is employed at a shot verifier, which verifies a shot boundary without playing the video.

14. The computer-readable medium of claim 10, the visual rhythm is employed at a video indexing system, a digital video editing system, a digital library, a video database, a multimedia video contents production system.

* * * * *